April 6, 1965  E. J. YINGLING  3,176,632
MULTIPLE USE PALLET
Filed April 12, 1962  2 Sheets-Sheet 1
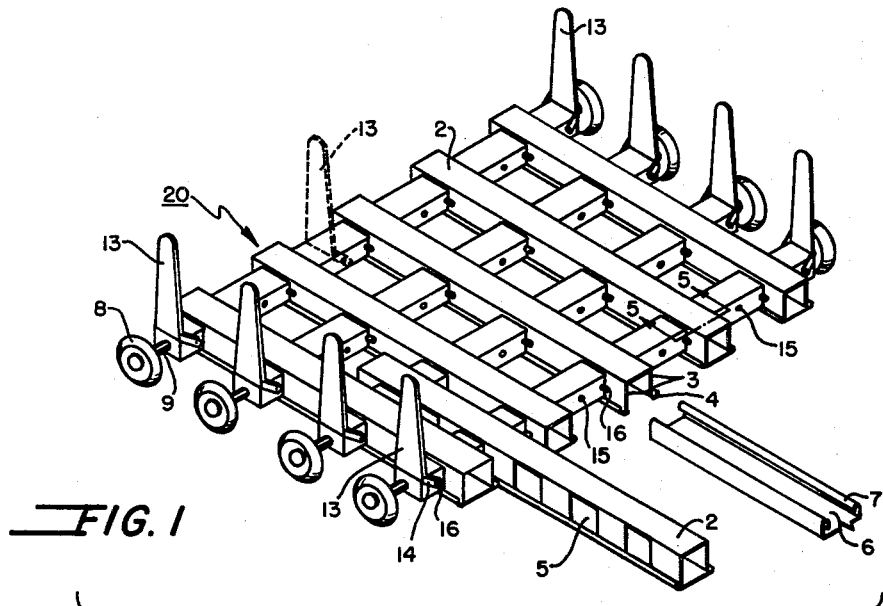
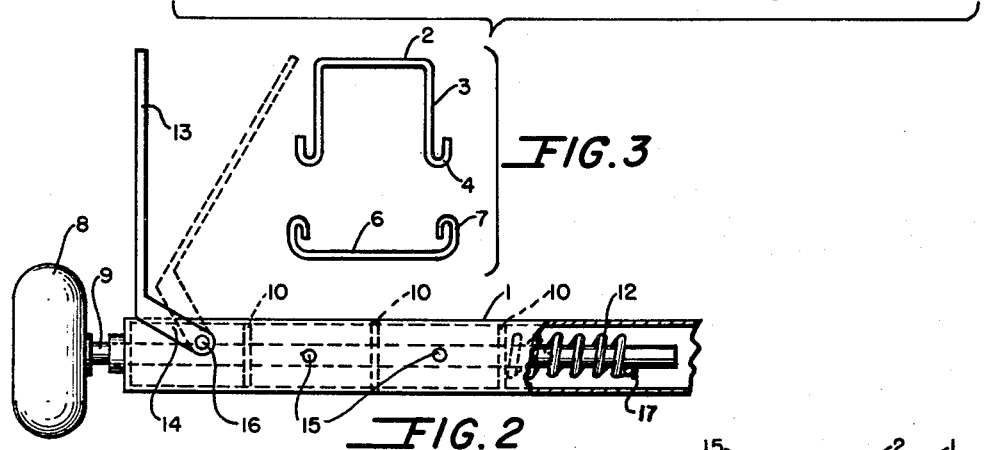
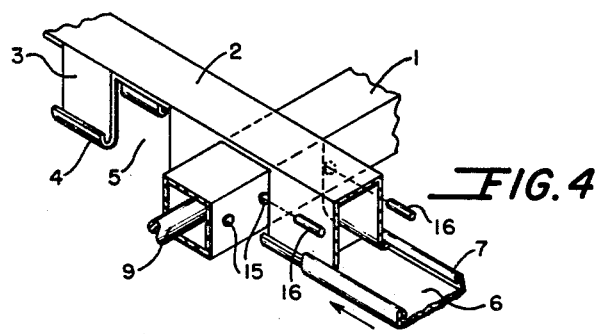
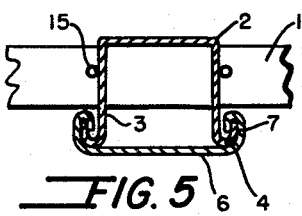
INVENTOR.
EDWARD J. YINGLING
BY
ATTORNEY April 6, 1965 E. J. YINGLING 3,176,632
MULTIPLE USE PALLET Filed April 12, 1962 2 Sheets-Sheet 2

INVENTOR.
EDWARD J. YINGLING
BY *Wm. R. Price*

ATTORNEY

United States Patent Office 3,176,632
Patented Apr. 6, 1965

3,176,632
MULTIPLE USE PALLET
Edward Joseph Yingling, 403 Lotis Way, Louisville, Ky.
Filed Apr. 12, 1962, Ser. No. 187,102
7 Claims. (Cl. 108—56)

This invention relates to pallets, such as those used warehousing operations of stacking and transporting of various objects. More specifically, this invention relates to a pallet adapted for use in loading and unloading trailers. More specifically, this invention relates to a pallet which is collapsible and extendable.

The major problem encountered in the materials handling industry is conservation of space. This problem has given rise to the use of pallets in which articles are stacked until a pallet load is obtained and a subsequent loaded pallet is stacked atop the first one. Due to the variations in size of the articles to be stored, most factories and warehouses require a great number of pallets of different sizes. In instances where the pallets are to be loaded onto trailers or boxcars, the width of the pallet can be standardized. Thus, the maximum width would be one sufficiently wide to load one pallet across the bed of the trailer. For smaller objects, the width might be adjusted to be one half that of the bed of the trailer. However, since the size of stored objects varies widely, it is necessary in most factories and warehouses to have available from five to twenty pallets of different sizes. The stocking of a large number of pallets of different sizes creates a problem of itself, since it involves the reservation of an excessive amount of storage space for pallets not in use. Further, the use of a variety of various sized pallets complicates the problem of loading trailers. Such complications involve proper usage of floor space in the trailer as well as weight and load distribution.

An object of this invention is, therefore, to provide a pallet of standardized width which is adjustable to any desired length.

Another object of this invention is a pallet which is easily adjustable as to the number of supporting cross bars required both in width and lengthwise dimensions.

Still another object of this invention is to provide a pallet of standardized width and means cooperating therewith which will facilitate loading and unloading of trailers.

Still another object of this invention is to provide a pallet having wheels which may be utilized in conjunction with track members to facilitate loading and unloading of said pallet onto truck trailers and the like.

Still another object of this invention is the provision of a pallet which may be quickly and easily assembled, so as to require little or no floor space for storage.

Other objects will appear from the following description and from the annexed drawing in which like reference characters indicate like parts throughout the several views, and wherein:

FIG. 1 is an isometric view of the assembled pallet.

FIG. 2 is a side elevational view of a portion of an axle channel member of the pallet, with portions cut away to illustrate its internal construction.

FIG. 3 is a schematic sectional view of the notched channel member and interlocking sleeve of my invention.

FIG. 4 is an isometric view of a fragment of a notched channel member and a fragment of the axle channel member of the pallet of my invention, which illustrates the method of interlocking the two members.

FIG. 5 is a fragmentary sectional view of the notched channel member and sleeve taken along lines 5—5 of FIG. 1.

Figure 6:
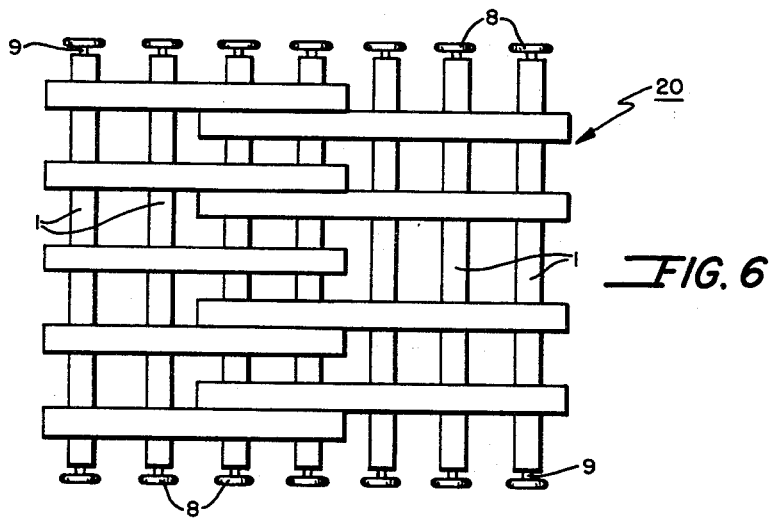
FIG. 6 is a plan view of a pallet made with the channel members of this invention illustrating the flexibility in expanding or modifying the structure of the finished pallet.

The pallet of the present invention can be considered as comprising two members, an axle channel member containing a shaft housing 1 and a notched channel member 2, containing notches which fit over the axle channels. The axle channel 1, as previously indicated, is standardized to provide a proper width for the pallet. This allows loading of one pallet across the bed of a trailer. The second channel member 2 contains notches 5, which interlock with the first or axle channel 1. The notches are bounded on each side by flanges 3, each of which has a rolled lip 4. A sleeve member 6 contains a reversed rolled lip 7 which is adapted to fit over the lip 4 of flange 3. The engagement of lip 7 of the sleeve member with lip 4 of the notched channel member locks the second channel securely to the first channel member. The axle channel contains holes 15 in which pins 16 may be inserted to hold channel member 2 securely in position. Axle channels are provided with a wheel 8 at either end which is rotatably connected to axle 9, the shaft of said axle being supported by guide plates 10. At the end of the shaft is connected a tension spring 12. The tension spring is secured to the axle 9 by pin 17. At either end of the axle member is a supporting arm 13, containing connecting legs 14, which are pivotably connected to the channel member by pin 16. This arm is arranged so as to stand vertically to support articles on the pallet or to be placed horizontally adjacent to the axle channel. This arm may be removed by removing pin 16 and moved to another position where the pivot pin is inserted in hole 15. In this manner, the arms may be adjusted to support the load on the pallet. This is best illustrated by the dotted lines in FIG. 1.

Considering now the construction of the various members, it will be seen that the number of axle channels may be varied depending upon the length, weight and shape of the articles to be palletized. Thus, with articles requiring a maximum of support as many as four axle channels may be utilized per notched channel. In other instances, an axle channel may be utilized at the terminal end of the notched channel, if support is not required. In like manner, the number of notched channels may be varied. It is possible, for example, to provide a platform-like effect by placing the notched channels side by side across the axle channels so as to form a solid coplanar surface across the width of the pallet. In other instances, it may be necessary only to utilize two or more notched channels to adequately support the load which is to be carried. By provision of the holes 15 and pins 16, the notched channels are held in place on the axle channel. Sleeve 6 is then inserted so that the reverse rolled lip 7 fits securely over lip 4 of flange 3 and the notched channel 2. Various adjustments in length are provided by placing the notched channel over 1, 2 or 3 of the axle channels as desired. In the modification illustrated in FIG. 6, the pallet has been extended to support a long, heavy load.

Figure 7:
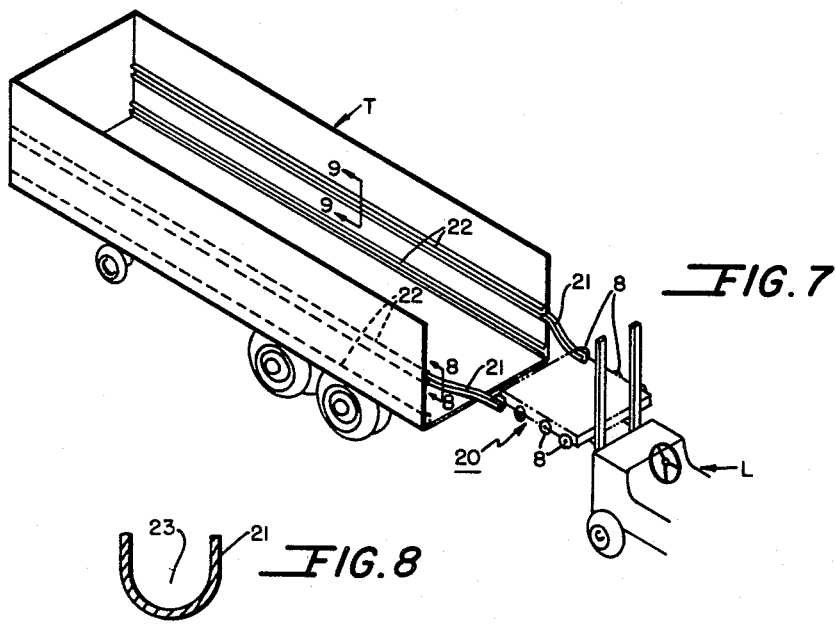
FIG. 7 is a schematic perspective view of the track members installed in a trailer, the roof of the trailer being omitted for better illustration, and also illustrating the feeder track used in conjunction therewith.
Figure 8:
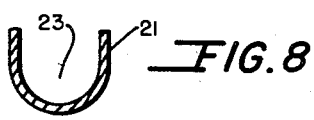
FIG. 8 is a fragmentary sectional view of the feeder track, taken along lines 8—8 of FIG. 7.
Figure 9:
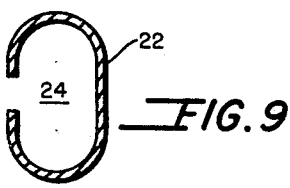
FIG. 9 is a fragmentary sectional view of the C track taken along lines 9—9 of FIG. 7.

Referring now to FIG. 7, a trailer T has been illustrated, the roof portion having been omitted for greater clarity, said trailer having C track members 22 extending the length of the trailer. A feeder track 21, fabricated of a U-shaped track member, is placed adjacent to the track member 22. The pallet 20 is lifted by fork lift truck L and placed onto feeder track 21. It will be noted that the feeder track 21 curves laterally so the wheels 8 of pallet 20 are put under tension as the pallet is pushed toward the trailer. This tensioning of the pallet helps to stabilize the load and prevents its shifting on the pallet during the loading operation. The lateral curvature of the feeder track 21, causes the axle 9 and wheel 8 to move six to eight inches laterally from the axle channel, i.e. the limit allowed by tension spring 12. The wheels 8 then engage with C track 22, and the pallet 20 is moved to the end of the trailer. In unloading the trailer, the wheels 8 gradually retract as they move medially along the feeder track 21. Due to the tensioning, provided by the tension springs 12, the load on the pallet does not shift during the unloading operation.

By use of the pallet of this invention, in conjunction with the track members, the time required for loading and unloading of trailers is greatly reduced. The pallet is adjustable in length to accommodate loading of various sized objects and the supporting channel members may be arranged to support heavy objects or light bulky objects. The supporting arm 13, may be moved inwardly to any desired position on the axle channel by the removal of pins 16, and insertion of said pins into holes 15 of the axle channel, at the location desired. Thus, unusually shaped objects may be secured to the pallet and due to the tensioning of the axle and wheel assemblies are stabilized against shifting during the loading and unloading operations.

It will be apparent that the pallet members of this invention provide means for producing pallets of various lengths and shapes and therefore offer complete flexibility in palletizing of objects. Secondly, the members of this invention provide complete flexibility in the distribution of weight encountered with various objects in that both the axle channels and the notched channels may be both increased or decreased according to the weight and weight distribution of the particular object to be palletized. As a result, a strong and serviceable pallet is produced which can be substituted for a great number of rigidly constructed pallets of various sizes now required under present day practices. As a result, the number of pallets which must be stocked by warehousemen can be reduced; it being possible to produce a pallet of the particular size and strength required for the objects at hand with a minimum of parts. Further, since the parts can be completely disassembled, these can be stored in a small space for use as required.

It is believed apparent from the foregoing that I have described pallet members capable of producing a pallet which is strong, easy to assemble, and which may be extended in length and in form according to the job to which it is put. Accordingly, many modifications will occur to those skilled in the art and it is not intended that the invention be limited to the specific construction illustrated and described herein but it encompasses modifications commensurate in scope with the description and the appended claims.

I claim:
1. A pallet comprising a first set of at least two channel members, a second set of at least two channel members, a set of sleeve members corresponding in number to said second set of channel members and a set of pins; each member of said first set of channel members containing a series of spaced holes for insertion of said pins and each member of said second set of channel members containing a series of notches which are adapted to fit over said first set of channel members and a series of flanges, in which each of said flanges contains a lip for engagement with said sleeve member, whereby said first and second set of channel members may be securely interlocked to form a pallet.

2. A pallet as defined in claim 1, in which each member of said first set of channel members contains a shaft housing and an axle and wheel assembly.

3. A pallet as defined in claim 2, in which the shaft housing comprises a series of guide plates which support the axle and a tension spring secured to said axle and which abuts the medial side of one of said guide plates, whereby the axle and wheel assembly may be extended and retracted.

4. A pallet as defined in claim 1, in which each member of said first set of channel members contains a set of removable supporting arms, each of said supporting arms comprising an elongated body portion and two leg portions, and in which each of said leg portions is disposed downwardly to straddle said channel member and in which each of said leg portions has a hole, adapted to register with one of the holes in said channel member, whereby the supporting arm member may be pivotably connected to said channel member by means of a pin inserted into said channel member.

5. A pallet member which comprises in combination, a notched channel member and a sleeve member, said notched channel member having notches adapted to fit securely over transverse supporting members and having a plurality of flanges in which each of said flanges has a lip adapted to slidably engage with said sleeve member.

6. A pallet member which comprises in combination, a channel member, a supporting arm member and a set of pins, said channel member containing a series of spaced holes along its sides and said supporting arm member comprising an elongated body portion and two leg portions, said leg portions extending downwardly so as to straddle said channel member, each leg portion having a hole adapted to register with a hole on said channel member and to pivot on said pin member, whereby said body portion of said supporting arm may be adjusted to any position defined by a 90° arc, from a vertical position to a horizontal position relative to said channel member and whereby said supporting arm member may be moved to other locations on said channel member and pivotably mounted thereon.

7. A pallet member which comprises a channel member containing a shaft housing and an axle and wheel assembly on each end, said shaft housing comprising a series of guide plates which support the axle, a tension spring mounted against the medial surface of one of said guide plates and secured to the axle, whereby the axle and wheel assembly may be extended and retracted.

References Cited by the Examiner

UNITED STATES PATENTS

| | | | |
|---|---|---|---|
| 867,999 | 10/07 | Norwich | 105—178 |
| 1,614,029 | 1/27 | Holdsworth | 105—178 |
| 1,944,771 | 1/34 | Webb et al. | 214—152 |
| 2,650,731 | 9/53 | Adler | 214—515 |
| 2,674,377 | 9/56 | Schoenecker | 248—120 |
| 2,972,463 | 2/61 | Matthews et al. | 248—120 |
| 2,990,967 | 7/61 | Voss | 214—515 |
| 2,992,749 | 7/61 | Spillios | 214—152 |

FRANK B. SHERRY, *Primary Examiner.*

HUGO O. SCHULZ, *Examiner.*